(12) United States Patent
Miller, Jr.

(10) Patent No.: US 7,393,151 B1
(45) Date of Patent: Jul. 1, 2008

(54) PORTABLE COMPUTER KEYBOARD

(76) Inventor: William B. Miller, Jr., 6526 N. 59th St., Paradise Valley, AZ (US) 85253

( * ) Notice: Subject to any disclaimer, the term of this patent is extended or adjusted under 35 U.S.C. 154(b) by 422 days.

(21) Appl. No.: 11/207,139

(22) Filed: Aug. 18, 2005

(51) Int. Cl.
  *B41J 5/10* (2006.01)
  *G06F 3/023* (2006.01)

(52) U.S. Cl. .................. 400/682; 400/680; 400/472

(58) Field of Classification Search .................. None
  See application file for complete search history.

(56) References Cited

U.S. PATENT DOCUMENTS

| | | | |
|---|---|---|---|
| 4,324,976 A * | 4/1982 | Lapeyre | 235/145 R |
| 5,543,790 A * | 8/1996 | Goldstein | 341/22 |
| 6,174,097 B1 * | 1/2001 | Daniel | 400/472 |
| 6,215,419 B1 * | 4/2001 | Leman | 341/22 |
| 6,370,018 B1 | 4/2002 | Miller, Jr. et al. | 361/680 |
| 6,392,870 B1 | 5/2002 | Miller, Jr. | 361/680 |
| 6,543,947 B2 | 4/2003 | Lee | 400/489 |
| 6,547,463 B1 | 4/2003 | Loo | 400/472 |
| 6,625,011 B2 | 9/2003 | Hyun | 361/680 |
| 6,628,508 B2 | 9/2003 | Lieu et al. | 361/180 |
| 6,671,170 B2 | 12/2003 | Webb et al. | 361/180 |
| 6,734,809 B1 * | 5/2004 | Olodort et al. | 341/22 |
| 6,882,336 B2 | 4/2005 | Lahr | 345/168 |
| 6,888,534 B1 | 5/2005 | Northway | 345/169 |
| 7,102,620 B2 * | 9/2006 | Harries et al. | 345/169 |
| 7,163,346 B2 * | 1/2007 | Lian | 400/489 |
| 2006/0012563 A1 * | 1/2006 | Fyke et al. | 345/156 |
| 2006/0099023 A1 * | 5/2006 | Katz et al. | 400/472 |
| 2006/0214916 A1 * | 9/2006 | Mulford | 345/169 |

* cited by examiner

*Primary Examiner*—Daniel J. Colilla
*Assistant Examiner*—Wynn' Q Ha
(74) *Attorney, Agent, or Firm*—Hooker & Habib, P.C.

(57) ABSTRACT

A portable keyboard enables full QWERTY touch typing with both hands or full QWERTY typing with one hand without external support. The keyboard includes a number of keypads that are selectively positionable to configure the keyboard in different keyboard configurations for use.

20 Claims, 4 Drawing Sheets

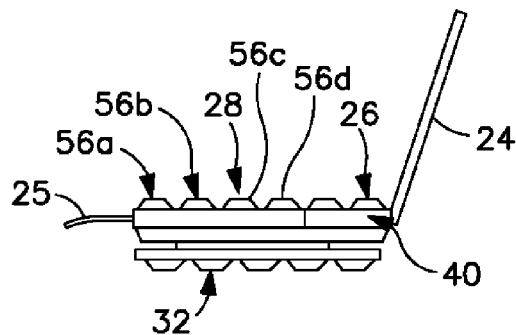
FIG. 3
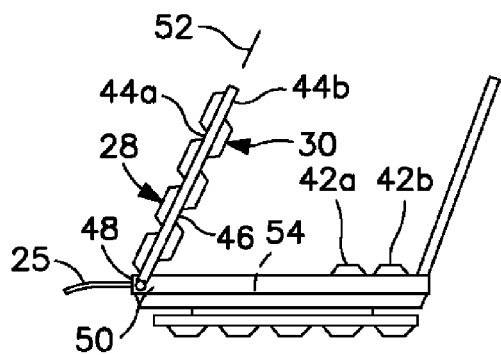
FIG. 4
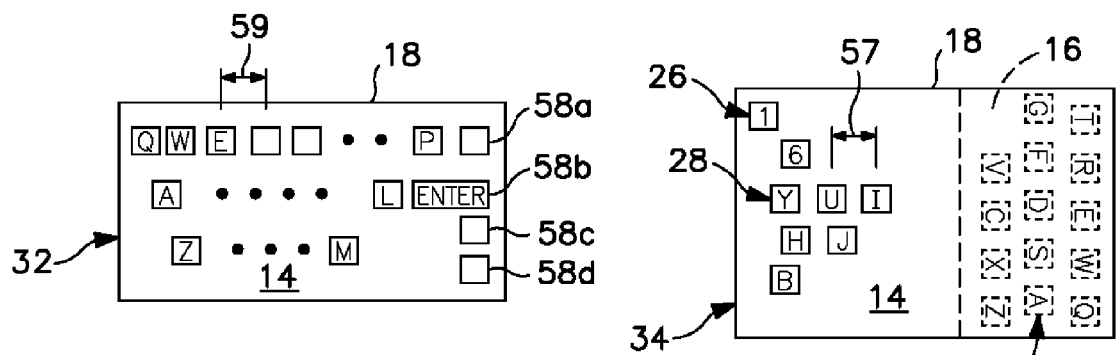
FIG. 6
FIG. 5

PORTABLE COMPUTER KEYBOARD

FIELD OF THE INVENTION

The invention relates to a portable keyboard, and particularly to a portable keyboard that can be used in different operating configurations.

BACKGROUND OF THE INVENTION

Handheld computers and other handheld electronic devices are very popular. These devices are held in the palm of the hand and typically run applications that store calendar and contact information, access the Internet or wireless telephone systems, or do word processing and the like. Such applications require the entry of numbers and text into the device.

Handheld electronic devices typically include a small keyboard for entering numbers and text. The keyboard has miniaturized keys laid out in a standard QWERTY arrangement. "QWERTY" refers to the most commonly used arrangement of keys on a keyboard and is named after the arrangement of letters in the left-hand corner of the keyboard. Because of their small size, the keys require "hunt and peck" typing with a single finger or a stylus. In either case, touch typing is impossible and data input is slow and tedious.

Some handheld devices include keyboards which eliminate keys to reduce size. Such keyboards require a "chording" system wherein two or more keys must be simultaneously pressed to generate keystrokes for the eliminated keys. Chording systems also do not enable touch typing and data input is slow.

Folding keyboards for handheld devices are also known. These keyboards open to form a full-sized keyboard similar to conventional keyboards used with desktop computers. Although these keyboards do allow touch typing, the keyboard must be supported on a flat work surface or table during use.

To meet the need for improved portable keyboards, my U.S. Pat. Nos. 6,370,018 and 6,392,870 (each of which is fully incorporated by reference herein) disclose portable keyboards that enable touch typing with both hands without external support. The '870 patent discloses one such portable keyboard that can be used in two different keyboard configurations for desktop touch typing or for hand-held touch typing. Two keypads are placed on opposite sides of the keyboard or adjacent each other to form the two keyboard configurations.

Although my portable keyboards are easy to use and provides many advantages, it is desirable to further increase user flexibility and provide more typing options. When hand-held, my keyboards are intended for two-hand touch typing. It is desired to offer the option of a hand-held keyboard that can also offer a full QWERTY keyboard for one-hand typing.

SUMMARY OF THE INVENTION

The present invention is directed to an improved portable keyboard for use with handheld electronic devices. The improved keyboard is selectively configurable for typing in at least three different keyboard configurations: one hand-held configuration for two-hand touch typing, a desktop configuration for two-hand touch typing, and an additional hand-held configuration that provides a full QWERTY keyboard for one-hand typing.

A keyboard having features of the present invention includes first and second keypads movably attached to a base. The keypads are movable with respect to the base between first and second mutually operating positions, each operating position representing a different keyboard configuration. In the first operating position the first keypad faces away from the base for typing on the first keypad, and in the second operating position the second keypad faces away from the base for typing on the second keypad.

In preferred embodiments of the invention the first and second keypads are mounted on opposite sides of a panel pivotally mounted on the base. The panel can also rotate to face either the first keypad or second keypad away from the base.

In a particularly preferred embodiment of the invention the keyboard includes a third keypad that enables the keyboard to offer at least three different keyboard configurations. The first and third keypads contain respective right-hand QWERTY keys and left-hand QWERTY keys. The second keypad contains both right-hand and left-hand QWERTY keys.

The first and third keypads cooperate in a first keyboard configuration for hand-held touch typing with left hand and right hand keypads on opposite sides of the keyboard. The first and second keypads cooperate in a second keyboard configuration for desktop touch typing with the right hand and left hand keypads adjacent to each other. The second keypad is used in the third keyboard configuration for hand-held, full QWERTY typing.

In particularly preferred embodiments of the present invention the third keypad is mechanically connected to the base for movement between operating positions. The mechanical connection in one possible embodiment has the third keypad rotatably mounted on an adjustable-length pivot arm pivotally attached to the base.

The keyboard may also include a fixed keypad that is used with the first and second keypads to define a keyboard portion. Keys intended for use with both the first and second keypads are included on the fixed keypad so that the first and second keypads do not include duplicate keys.

The portable keyboard of the present invention offers a hand held keyboard for use with a portable electronic device that offers a full QWERTY keyboard to both touch typists and non-touch typists, as well as use as a full desktop keyboard. The keyboard can be easily and quickly placed in any of the three configurations without the need to remove the device.

Other objects and features of the invention will become apparent as the description proceeds, especially when taken in conjunction with the accompanying four sheets of drawings illustrating an embodiment of the invention.

BRIEF DESCRIPTION OF THE DRAWINGS

FIG. 3 is a side view of the keyboard taken along line 3-3 of FIG. 1 but with the screen removed;

FIG. 4 is a side view of the keyboard transitioning between the first keyboard configuration and a second keyboard configuration;

FIG. 5 is a schematic front view of the keyboard in the first operating position showing the orientation of a front first keypad and a rear second keypad;

FIG. 6 is a schematic front view of the keyboard in the second operating position showing the orientation of a front third keypad;

DESCRIPTION OF THE PREFERRED EMBODIMENT

Figure 1:
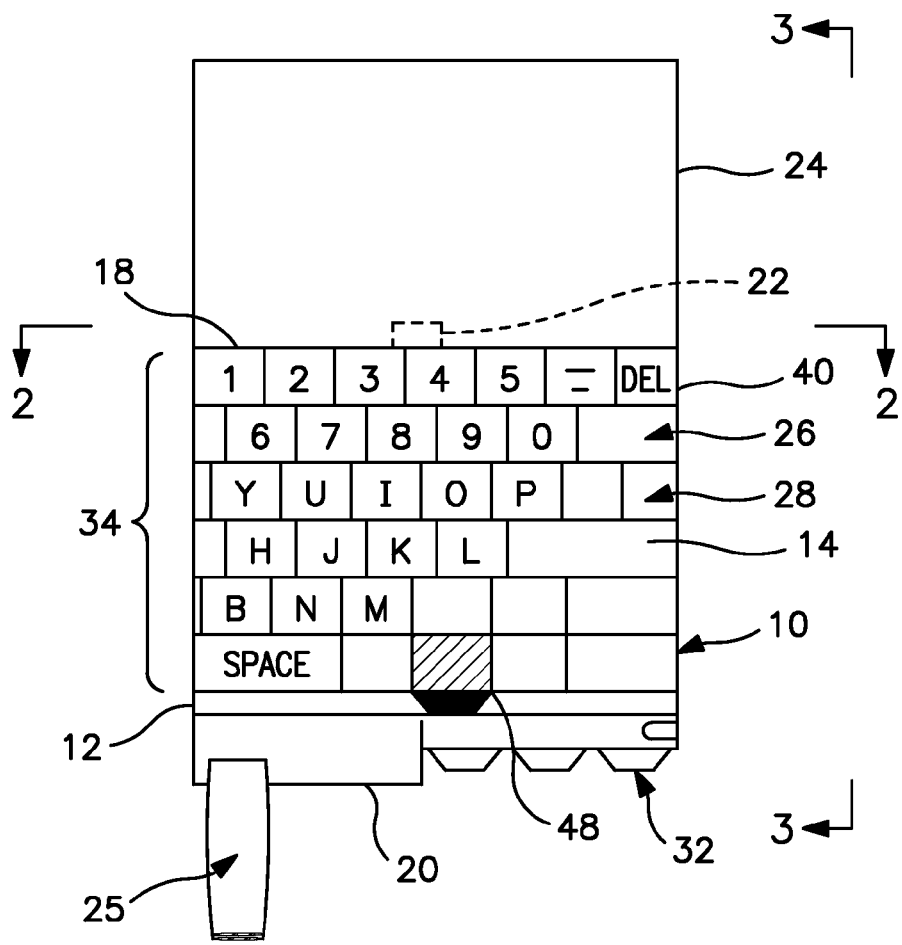
FIG. 1 is generally a front view of a portable computer keyboard attached to a screen in accordance with the present invention and representationally illustrating part of a keypad on the bottom of the keyboard, the keyboard in a first keyboard configuration.

The figures illustrate a portable keyboard 10 for a portable handheld electronic device in accordance with the present invention. The keyboard 10 has a body or base 12 having upper and lower sides 14, 16 respectively and extending between forward and rear keyboard ends 18, 20 respectively. See FIGS. 1-3. The base 12 includes an attachment port 22 configured to electrically and mechanically connect the keyboard to a screen or portable electronic device 24. A strap 25 connected to the base helps a user support the keyboard 10 on his or her arm for use.

Mounted on the upper side of the base 12 is a first keypad 26, a second keypad 28, and a third keypad 30 (see FIG. 4). Keypads 28 and 30 are simultaneously movable to first and second operating positions as will be described in greater detail below. In the first operating position shown in FIG. 1 keypad 28 faces away from the upper side of the base 12 for typing. In the second operating position shown in FIG. 6 keypad 30 faces away from the upper side of the base 12 for typing.

Keyboard 10 also includes a fourth keypad 32 that is movable between two operating positions. In the first operating position shown in FIG. 1 keypad 32 is adjacent the lower side of the base 12 and faces away from the base. In the second operating position shown in FIG. 11 keypad 32 is adjacent keypad 28 in its first operating position and both keypads 28, 32 face the same direction.

Figure 2:
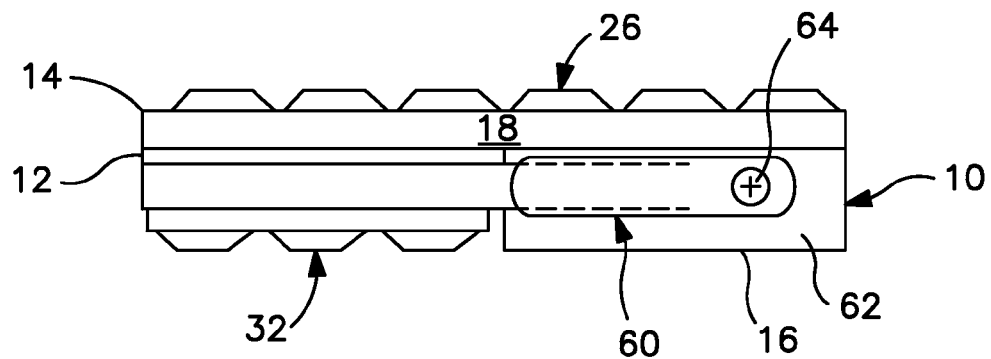
FIG. 2 is a top view of the keyboard taken along line 2-2 of FIG. 1 but with the screen removed.

The movable keypads allow the keyboard 10 to be selectively configurable in at least three different keyboard configurations. The first keyboard configuration shown in FIGS. 1-3 is for cross-handed typing with the keyboard held between opposed hands. A first keyboard portion 34 is formed from keypad 26 and keypad 28 on one side of the keyboard, and a second keyboard portion is formed solely from keypad 32 on the other side of the keyboard.

The keyboard is held between opposed right and left hands, with one hand touch typing on keyboard portion 34 and the other hand touch typing on keyboard portion 32. As shown in FIG. 5, the rows of keys of keyboard portion 34 are transverse to the rows of keys of the second board portion 32.

Figure 11:
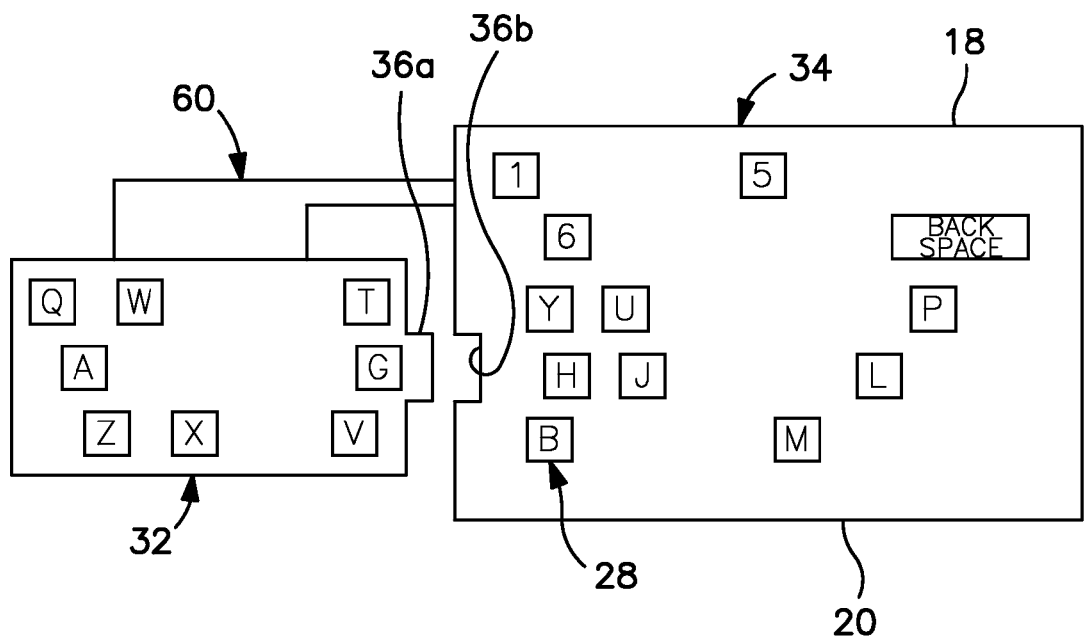

The second configuration shown in FIG. 11 is for a desktop keyboard, with both hands typing on the same side of the keyboard. Keypads 26 and 28 together form the right-hand keyboard portion 34 as previously described, and keypad 32 solely forms the left-hand portion of the keyboard. Keypads 28 and 32 are mechanically and electrically connected by respective socket connectors 36a, 36b. Connectors 36 correspond to socket connectors 528, 530 as described in my '870 patent and so will not be described in greater detail.

The third configuration shown in FIG. 6 is for a hand-held keyboard that enables single-hand typing on a full QWERTY keyboard. The keyboard configuration is essentially the same as the first keyboard configuration except that keypad 30 is in the second operating position and cooperates with keypad 26 to form keyboard portion 34. Keypad 26 and keypad 30 together form a full, compact QWERTY keyboard accessible for typing with one hand on one side of the keyboard. Preferably keypad 32 is stowed beneath the base 12 in the position shown in FIG. 1 to save space and is not used in this third keyboard configuration.

Keypad 26 is attached to a forward base portion 40 and includes two rows of keys 42a, 42b (see FIG. 4; not all keys are shown in the drawings). Keypad 26 is fixedly attached to the base, that is, except for keystroke travel the rows of keys 42a, 42b remain fixed with respect to the base. In the illustrated embodiment key rows 42a, 42b contain the number keys corresponding to the number keys of a conventional keyboard layout. The keys are spaced for touch typing.

Keypads 28 and 30 are mounted on opposite sides 44a, 44b of a body panel 46. Panel 46 is rotatably and pivotally attached to the base 12 by a mechanical connection 48. Rotatable and pivotal connections are known in the electromechanical art for connecting active electronic components and can be readily adapted for use in the present invention. One end of the panel is pivotally mounted to the base to rotate about an axis of rotation 50. The panel can also rotate about an axis of rotation 52 transverse to axis 50.

Panel 46 enables the keypads 28, 30 to be selectively placed in either of the first and second operating positions. The panel 46 is pivoted to raise the keypads 28, 30 from the upper surface of the base 12 (see FIG. 4). Panel 46 is rotatable at least one-hundred eighty degrees about axis 52 so that either keypad 28 or keypad 30 faces away from the base for typing with the panel is lowered back into place. The base includes a wall 54 defining a recess or cavity that receives the inactive keypad 28 or 30 when the panel is lowered.

In the illustrated embodiment keypad 28 is intended for typing with the right hand and includes four rows 56a-56d of right-hand QWERTY keys (see FIG. 3; not all keys are shown in the drawings). Keypads 26 and 28 do not share duplicate keys in common as the keypads are intended to cooperatively define the keyboard portion 34. The keys along each row have generally a uniform pitch spacing 57 (preferably similar to the spacing of keypad 26) suitable for touch typing.

In the illustrated embodiment keypad 30 cooperates with keypad 26 to define a full QWERTY keyboard and includes four rows 58a-58d of both left-hand QWERTY keys and right-hand QWERTY keys (see FIG. 6; not all the keys are shown in the drawings). Keypads 26 and 30 do not have duplicate keys in common as the keypads are intended to cooperatively define the keyboard. Keypad 30 has more keys than keyboard 28. The pitch spacing 59 along each row is tighter than the pitch spacing 57 and is not necessarily suitable for touch typing.

Figure 7:
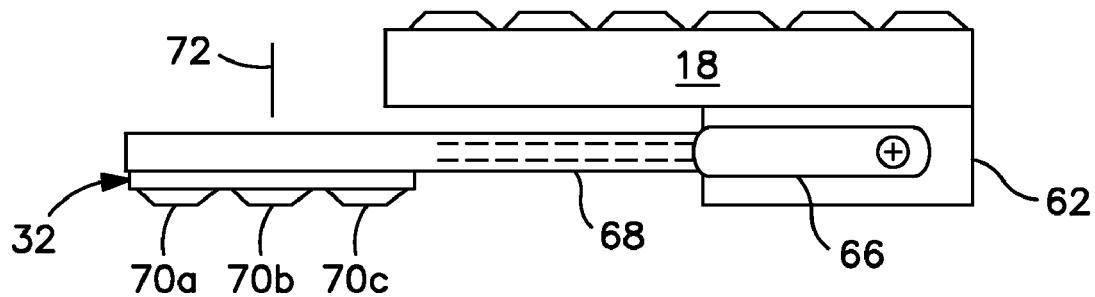
FIGS. 7-9 are side views similar to FIG. 2 but of the keyboard transitioning from the first keyboard configuration shown in FIG. 1 partway to a third keyboard configuration with the first and second keypads adjacent one another and facing the same direction.

Keyboard 32 is mechanically connected to the base 12 by a cantilevered pivot arm 60. See FIG. 2. Pivot arm 60 is pivotally mounted to lower base portion 62 for rotation about an axis of rotation 64. Pivot arm 60 is an adjustable-length structure formed from telescoping arm members 66, 68 shown in FIG. 7.

Figure 8:
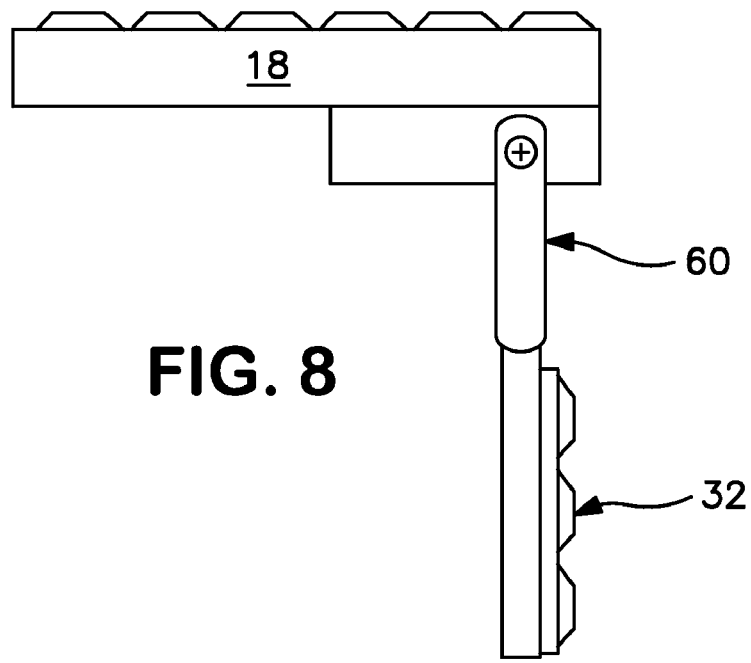
Figure 9:
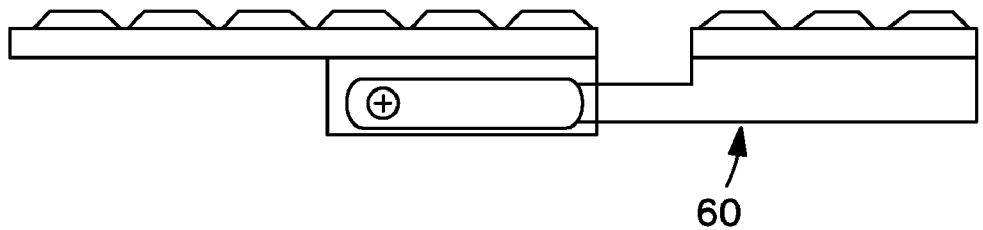
Figure 10:
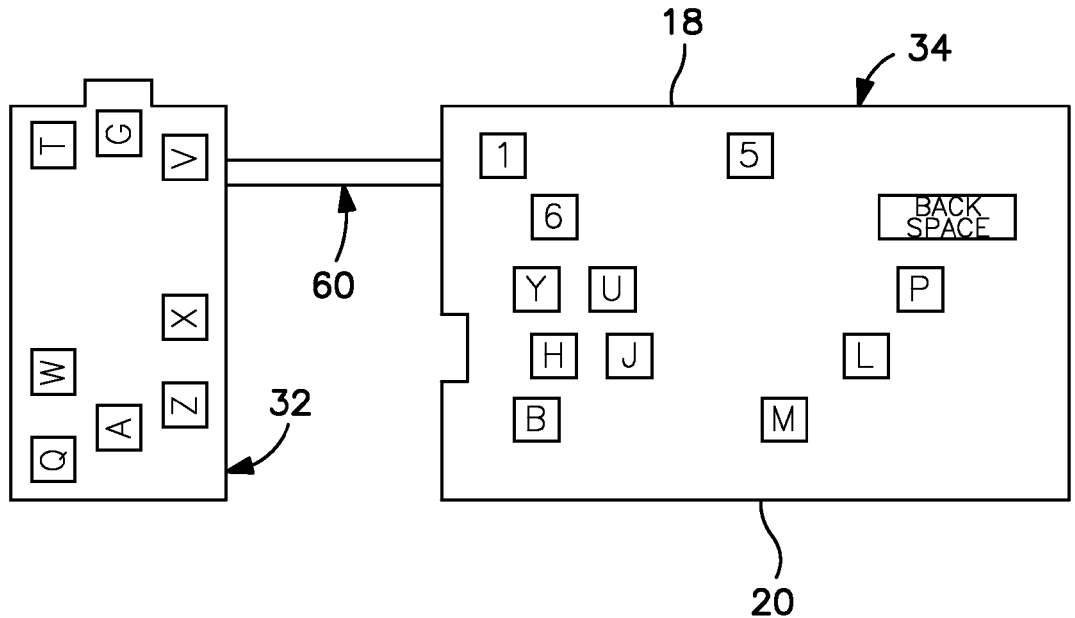
FIGS. 10-11 are schematic front views of the keyboard transitioning from the first keyboard configuration to the third keyboard configuration.

In the illustrated embodiment keypad 32 is intended for typing with the left hand and includes three rows 70a-70c of left-hand QWERTY keys (see FIG. 8; not all keys are shown in the drawings). The key spacing is preferably the same as that of the second keypad 28 for touch typing. As shown in FIGS. 5 and 11, keypad rows 70 are substantially perpendicular to the rows of keypad 28 when the keyboard 10 is in its first keyboard configuration, and are substantially parallel with the rows of keypad 28 when the keyboard 10 is in its second keyboard configuration. Keypad 32 is rotatably mounted on the free end of arm 60 for rotation of at least 90 degrees to selectively orient the keypad rows 70 in the first and second keyboard orientations.

FIGS. 7-10 illustrate moving the keypad 32 from its first operating position shown in FIG. 1 to its second operating position connected with keypad 28 shown in FIG. 11 (FIG. 11 shows the keypads slightly separated to illustrate alignment of connectors 36). When keypad 32 is in its first operating position, the pivot arm 60 is at its shortest length to locate the keypad 32 immediately adjacent lower base portion 62.

To begin the transition, keypad 32 is pulled away from base portion 62 to enable the keypad to clear the base with rotation. See FIG. 7. The pivot arm is rotated through the position shown in FIG. 8 to that shown in FIG. 9 to place keypad 32 facing the same direction as keypad 28. Keypad 32 is next rotated 90 degrees from the angular position shown in FIG. 10 to the angular position shown in FIG. 11 (if necessary the pivot arm is lengthened to provide clearance for rotation). This aligns the row of keypads 28, 32 and keypad connectors 36a, 36b. Keypad 32 is pushed against the keypad 28 to engage the socket connectors 36 and complete the transition. Reversing the steps returns the keypad 32 to its stowed position beneath the base 12.

The illustrated keyboard has a fixed keypad 26 that is usable with keypad 28 or keypad 30 to enable a reduction in the number of keys carried on the panel 46. In other embodiments of the invention the keypad 26 can be eliminated.

The illustrated keyboard is intended to be operable in at least three different keyboard configurations. In yet other embodiments of the present invention the keyboard can be operable in at least four different keyboard configurations. The fourth configuration is similar to the third configuration but has keypad 30 in its second operating position to form a desktop keyboard. In such embodiments keypad 30 can include a socket connector for connecting to keypad 32.

Yet other embodiments of the present invention can be operable in only two keyboard configurations by removing keypad 32. In such an embodiment, for example, keypad 28 can be used to provide a keyboard for specialized input (say, for APL programming) and keypad 30 can be used to provide a keyboard for full QWERTY input as described. Of course other inputs can be provided.

Although the first keyboard configuration described above is intended to be supported by the left hand for opposed-hands typing, in other embodiments of the present invention the keyboard can be designed to be supported by the right hand.

In yet other embodiments of the present invention other keyboard layouts or character sets of other languages can be used. The "QWERTY" keypad arrangement shown in the preferred embodiments is intended to be representative of known standardized touch typing conventions, and other touch typing conventions (such as the Dvorak keyboard arrangement) can be substituted therefor. The term "QWERTY" should be understood as a generic term for such standardized touch typing conventions.

Chording systems that require a combination of keys to be simultaneously pressed to generate a particular keystroke can also be used in other embodiments of the present invention.

In yet additional embodiments the electronic device 24 can be permanently connected to the keyboard.

In still addition embodiments the keyboard electrical connections for the fourth keypad 32 may be contained within the pivot arm 60 so that electrical connection by connectors 36a and 36b is not required.

While I have illustrated and described preferred embodiments of my invention, it is understood that these are capable of modification, and I therefore do not wish to be limited to the precise details set forth, but desire to avail myself of such changes and alterations as fall within the purview of the following claims.

What I claim as my invention is:

1. A keyboard configurable for typing in one of three different selectable keyboard configurations, the keyboard comprising:
    a base having opposed first and second sides and an end extending between the sides, a first keypad, a second keypad, and a third keypad, each keypad comprising a plurality of keys;
    a first connection mounting the first and second keypads on the first side of the base, the first connection selectively positioning the first and second keypads in first and second operating positions on the first side of the base, the first keypad facing away from the first side of the base in the first operating position for typing on said first keypad, the second keypad facing away from the first side of the base when in the second operating position for typing on said second keypad;
    a second connection mounting the third keypad to the base, the second connection selectively positioning the third keypad in third and fourth operating positions with respect to the base, the third keypad on the second side of the base and facing away from the base when in the third operating position and adjacent the end of the base and facing the same direction as the first side of the base when in the fourth operating position;
    wherein the keyboard can be placed in a first keyboard configuration with the first and second keypads in the first operating position and the third keypad in the third operating position so that the keyboard can be held between opposed right and left hands of a user for typing on the first and third keypads with said opposed hands;
    wherein the keyboard can be placed in a second keyboard configuration with the first and second keypads in the first operating position and the third keypad in its fourth operating position for typing with both hands of a user on the same side of the keyboard; and
    wherein the keyboard can be placed in a third keyboard configuration with the first and second keypads in the second operating position for typing on the said second keypad by a user.

2. The keyboard of claim 1 wherein the first keypad comprises a plurality of one of left-hand QWERTY keys or right-hand QWERTY keys, and the third keypad comprises a plurality of the other of left-hand QWERTY keys or right-hand QWERTY keys.

3. The keyboard of claim 1 wherein the second keypad comprises a plurality of left-hand QWERTY keys and a plurality of right-hand QWERTY keys.

4. The keyboard of claim 1 comprising a fourth keypad on the first one side of the base for typing on said fourth keypad, the fourth keypad in a fixed position relative to the base.

5. The keyboard of claim 1 wherein the first connection mounts the first and second keypads for conjoint movement between first and second operating positions and mechanically connects the first and second keypads to the base throughout the movement.

6. The keyboard of claim 1 wherein the first connection comprises a panel rotatably mounted to the base, the panel having opposite sides, the first keypad mounted on one side of the panel and the second keypad mounted on the other side of the panel, the panel rotatable about a first axis to place the first and second keypads in first and second operating positions.

7. The keyboard of claim 6 wherein the first connection comprises the panel being pivotally mounted to the base for rotation about a second axis transverse to the first axis.

8. The keyboard of claim 1 wherein the base comprises a wall defining a recess, the second keypad received in the recess when in the first operating position, the first keypad received in the recess when in the second operating position.

9. The keyboard of claim 1 wherein the second connection mechanically loins the third keypad and the base and defines the path of movement of the third keypad between third and fourth operating positions.

10. The keyboard of claim 9 wherein the second connection comprises an arm comprising opposite end portions, one end portion pivotally mounted to the base and the other end portion attached to the third keypad.

11. The keyboard of claim 10 wherein the arm is an adjustable-length assembly.

12. The keyboard of claim 11 wherein the third keypad is rotatably mounted to the arm.

13. The keyboard of claim 1 wherein the first keypad comprises a plurality of keys spaced at a first pitch and the second keypad comprises a plurality of keys spaced at a second pitch different from the first pitch.

14. The keyboard of claim 1 wherein the first keypad comprises a first number of keys and the second keypad comprises a second number of keys different from the first number.

15. A keyboard selectively configurable for typing in at least two different keyboard configurations, the keyboard comprising:
 a base having opposed sides, first and second keypads attached to the base, each keypad comprising a plurality of keys;
 a connection movably attaching the first and second keypads to the base, the connection comprising a panel pivotally mounted to the base for movement about a first axis and rotationally mounted to the base to rotate the panel about a second axis transverse to the first axis, the first and second keypads located on opposite sides of the panel, the panel movable with respect to the base between first and second mutually exclusive operating positions, the operating positions representing respective first and second keyboard configurations, the first keypad facing away from one side of the base for typing on said first keypad when in the first operating position and the second keypad facing away from the one side of the base for typing on said second keypad when in the second operating position.

16. The keyboard of claim 15 wherein the keys of the second keypad comprise a first set of keys corresponding to the keys of the first keypad and a second set of keys not included with the first keypad.

17. The keyboard of claim 15 wherein the first keypad comprises a first number of keys and the second keypad comprises a second number of keys different from the first number.

18. A keyboard selectively configurable for typing in at least two different keyboard configurations, the keyboard comprising:
 a base having opposed sides, first and second keypads attached to the base, each keypad comprising a plurality of keys;
 a connection movably attaching the first and second keypads to the base, the first and second keypads movable with respect to the base between first and second mutually exclusive operating positions, the operating positions representing respective first and second keyboard configurations, the first keypad facing away from one side of the base for typing on said first keypad when in the first operating position and the second keypad facing away from the one side of the base for typing on said second keypad when in the second operating position;
 wherein the keys of the first keypad are spaced at a first pitch and the keys of the second are spaced at a second pitch different from the first pitch.

19. The keyboard of claim 15 wherein the keys of at least one of the first and second keypads comprises right-hand QWERTY keys and left-hand QWERTY keys.

20. A keyboard selectively configurable for typing in at least two different keyboard configurations, the keyboard comprising:
 a base having opposed sides, first and second keypads attached to the base, each keypad comprising a plurality of keys;
 a connection movably attaching the first and second keypads to the base, the first and second keypads movable with respect to the base between first and second mutually exclusive operating positions, the operating positions representing respective first and second keyboard configurations, the first keypad facing away from one side of the base for typing on said first keypad when in the first operating position and the second keypad facing away from the one side of the base for typing on said second keypad when in the second operating position;
 wherein the base comprises a recess that receives the inoperative keypad when the keypads are in the first or second operating positions.

* * * * *